United States Patent [19]

Kleinerman et al.

[11] Patent Number: 4,888,829
[45] Date of Patent: Dec. 26, 1989

[54] GLOVES

[75] Inventors: George J. Kleinerman; John M. Woodcock, both of King's Lynn, England

[73] Assignee: Porvair Limited, King's Lynn, England

[21] Appl. No.: 263,987

[22] Filed: Oct. 27, 1988

Related U.S. Application Data

[63] Continuation of Ser. No. 921,189, Oct. 21, 1986, abandoned.

[30] Foreign Application Priority Data

Oct. 21, 1985 [GB] United Kingdom ............... 8525866

[51] Int. Cl.$^4$ ............................................. A41D 19/00
[52] U.S. Cl. ............................................. 2/167; 2/168
[58] Field of Search ................................. 2/167, 168

[56] References Cited

U.S. PATENT DOCUMENTS

| 2,871,218 | 1/1959 | Schollenberger | 525/440 |
| 3,094,704 | 6/1963 | Abildgaard | 2/167 |
| 3,709,864 | 1/1973 | Loew et al. | 524/726 |
| 3,879,764 | 4/1975 | Weber-Liel | 2/167 |
| 4,497,072 | 2/1985 | Watanabe | 2/167 X |
| 4,539,255 | 9/1985 | Sato et al. | 2/168 X |
| 4,545,841 | 10/1985 | Jackrel | 2/167 X |
| 4,578,826 | 4/1986 | Adiletta | 2/167 |
| 4,660,228 | 4/1987 | Ogawa et al. | 2/168 X |
| 4,670,330 | 6/1987 | Ishiwata | 2/168 X |

FOREIGN PATENT DOCUMENTS

| 0037744 | 10/1981 | European Pat. Off. . |
| 0037745 | 10/1981 | European Pat. Off. . |
| 0081850 | 4/1986 | European Pat. Off. . |
| 2737756 | 3/1979 | Fed. Rep. of Germany . |
| 0859640 | 1/1961 | United Kingdom ............ 2/167 |
| 1173143 | 12/1969 | United Kingdom . |
| 1273524 | 5/1972 | United Kingdom ............ 2/167 |

Primary Examiner—Werner H. Schroeder
Assistant Examiner—Sara M. Current
Attorney, Agent, or Firm—Millen, White & Zelano

[57] ABSTRACT

Flexible form fitting seamless gloves made from an elastomeric polyurethane material containing fiber reinforcements. The material forming the back of the hands of the gloves has a thickness of 0.05 to 0.45 mm a water vapor permeability of 75 to 200, a hydrostatic head of 300 to 700 cm of water, a tensile tear factor of 0.20 to 1.20, and initial modulus at 25% elongation of less that 0.35 kg/cm and a elongation at break of at least 200%.

16 Claims, 2 Drawing Sheets

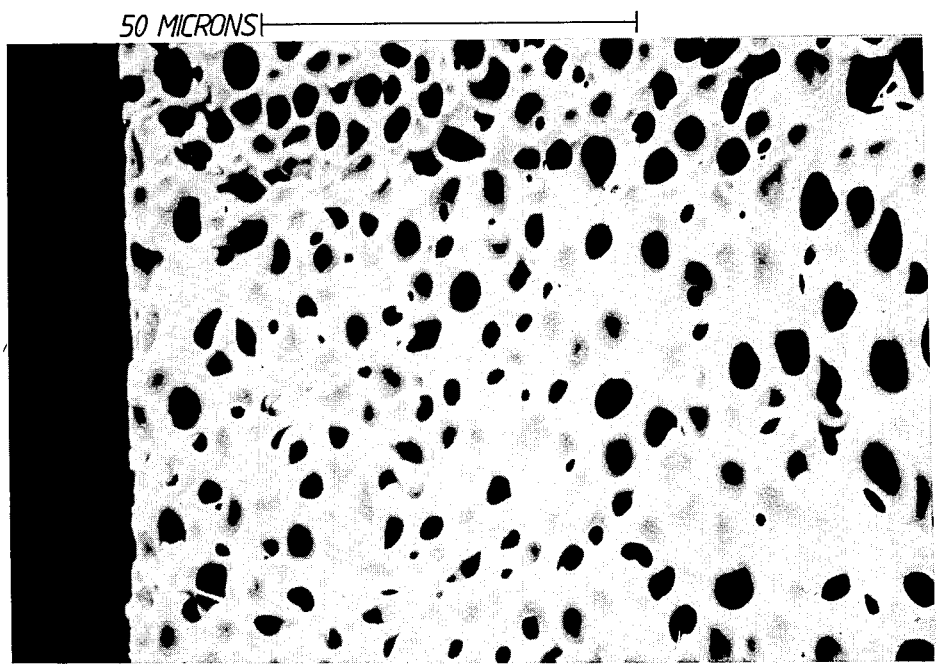
FIG. IC.

GLOVES

This application is a continuation of application Ser. No. 06/921,189, filed Oct. 21, 1986, now abandoned.

The present invention relates to seamless continuous film gloves fashioned to fit to the hand. Such gloves are conventionally known as rubber gloves and are made from natural or synthetic rubbers by dipping hand-shaped formers into liquid rubber compositions so as to form a layer over the surface of the former which layer is then solidified to produce a continuous film which is not only highly and essentially completely resistant to penetration by liquid water, but is also substantially impermeable to water vapour, typically having a WVP (as defined herein) of less than 20.

Such gloves vary in thickness and in the closeness of fit to the hand depending on the use to which the rubber glove is to be put.

Conventional rubber gloves, whether a tight or less close fit to the hand being impermeable to water vapor, do not provide a ready route for the dissipation of sweat and thus, if worn for any length of time, cause discomfort to the wearer.

Such gloves are conventionally highly flexible and thin, e.g. 0.1 to 0.45 mm thick; it is also desirable that they should stretch so as to fit different sized hands. In addition to resistance to penetration at least by liquid water and desirably other aqueous liquids (e.g. containing detergents) and desirably also at least some organic liquids, protective gloves should have strength characteristics sufficient to make them economically useful.

We have previously proposed in our G.B. Patent No. 1273524 the use of certain polyurethane materials to make dipped shoe upper materials on preshaped shoe last like formers. This proposal made thick layers (0.5 to 5 mm) of polymer which were produced in water vapor permeable form by incorporation of finely divided sodium chloride. The thick highly viscous layers were coagulated in water and the salt leached out.

Such materials typically had a combination of water vapor permeability and resistance to penetration by liquid water as measured by their hydrostatic head (see below) which is inappropriate for gloves of the rubber glove type. Moreover, the materials were so inflexible as to be self-supporting.

According to the present invention flexible form fitting seamless gloves are made from elastomeric polyurethane material, optionally containing fibre reinforcement, and samples cut from the backs of the hands of the gloves have a thickness of 0.05 to 0.45 mm, preferably 0.10 to 0.40, a WVP (as defined herein) in the range of 75 to 200, e.g. 100 to 170 especially 120 to 160, a hydrostatic head (as defined herein) in the range 300 to 700 cm of water, a tensile tear factor (as herein defined) of 0.20 to 1.20, especially 0.40 to 0.80, an initial modulus at 25% elongation not in excess of 0.35 kg/cm, e.g. in the range 0.05 to 0.30, e.g. 0.10 to 0.30, and an elongation at break of at least 200%, e.g. 200 to 600, especially 300 to 500.

The materials typically have a density of 0.25 to 0.60 g/cm$^3$, e.g. 0.30 to 0.55.

The polyurethane is preferably an aliphatic polyester polyurethane characterized by the following properties measured on an evaporated cast void free film 0.15.0.2 mm thick;

an adjusted initial modulus at 25% elongation (as herein defined) of less than 50 kg/cm$^2$, e.g. 2.5 to 50 preferably 5 or 10 to 40, e.g. in the range 30–40, an adjusted tensile strength (as herein defined) of at least 200 kg/cm$^2$, e.g. 200 to 600 especially 430 to 470, an elongation at break of at least 300%, e.g. 300 to 800%, desirably at least 500%, especially 650 to 680%, an adjusted tear propagation (as herein defined) of at least 50 kg/cm e.g. 50 to 170, desirably 130 to 150, especially 135 to 145, and a water vapor permeability (as herein defined) of no more than 20.

The preferred polyurethane (again, tested as a thin film made as described above) recovers completely from a 5% elongation at room temperature (23° C.) but preferably does take on a permanent set (one measured for example as in an ASTM D412-66) after 100% elongation. This set is usually within the range of about 2 to 20%, as in the range of about 3 to 10%, e.g. about 6%. The "permanent set" is usually measured an hour after the release of stress; for example, a material which shows a tension set of some 10% immediately on release of the clamps after being held at the 100% elongation for 10 minutes will have a tension set of 6% measured 1 hour after the release of the clamps. (In the measurement a film specimen 1 cm wide with a gauge length of 5 cm is strained to the 100% elongation at a rate of 100 cm per minute).

The polyurethane provides a glove having a selected permeability to water vapor and affording an outer surface having a selected resistance to liquid water penetration under a pressure differential between the faces of the material, whereby the said outer surface is hydrophobic.

The invention also extends to a method of making flexible form fitting seamless gloves which comprises forming a solution of an elastomeric thermoplastic polyurethane having an intrinsic viscosity in the range 0.5 to 0.85 dl/g preferably 0.55 to 0.75, especially 0.60 to 0.75, in a solvent at a concentration of at least 15% by weight, preferably at least 20%, e.g. 20 to 30% by weight, the solution having a viscosity not in excess of 150 poise and preferably in the range 10 to 100 poise, e.g. 20 to 90, at 24° C. as measured on a Brookfield LVT viscometer using a No. 4 spindle at 12 rpm, forming a continuous layer of the said solution on a former of the desired glove form, and solidifying the said layer on the former to form fitting seamless shape, preferably by exposing the said layer to a nonsolvent for the said polyurethane whereby the polyurethane is coagulated, the coagulated material after leaching to remove the solvent and drying having a WVP of at least 75 and a hydrostatic head of at least 300 cm of water.

The invention may be put into practice in various ways and a number of specific embodiments in accordance with the invention will be described by way of example with reference to the accompanying drawings in which:

FIG. 1C is an enlarged view of the surface at the left hand edge of FIG. 1A at 1250 fold magnification; 50 microns is represented by the scale at the top of the photomicrograph.

Figure 1A:
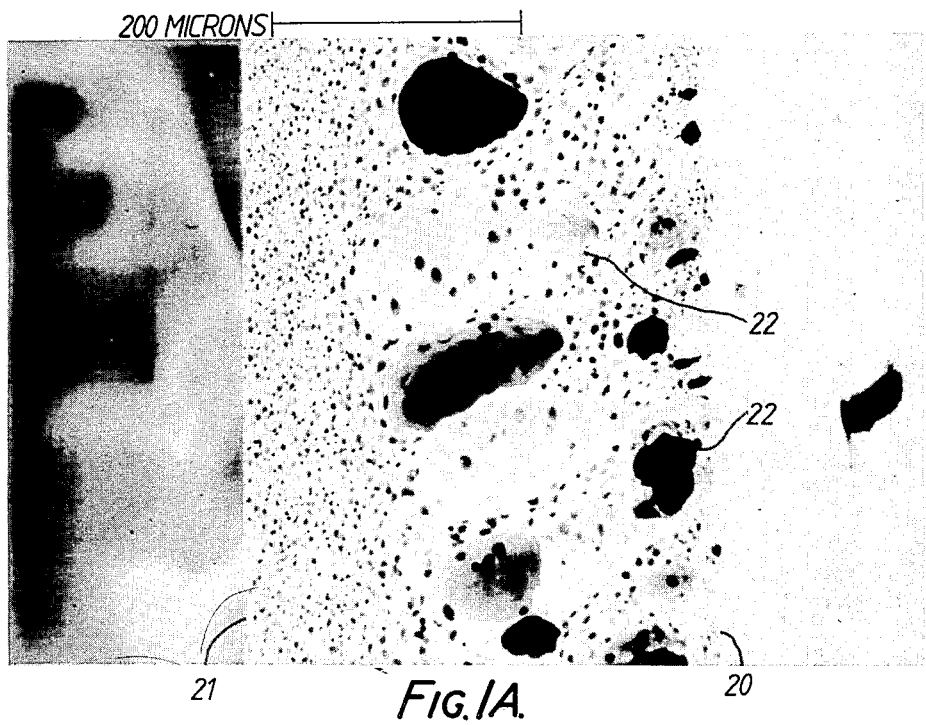
FIG. 1A is a transverse cross-section through the thickness of the product of Example 1 head on to the cut surface and is at 210 fold magnification; 200 microns is represented by the scale at the top of the photomicrograph.
Figure 1B:
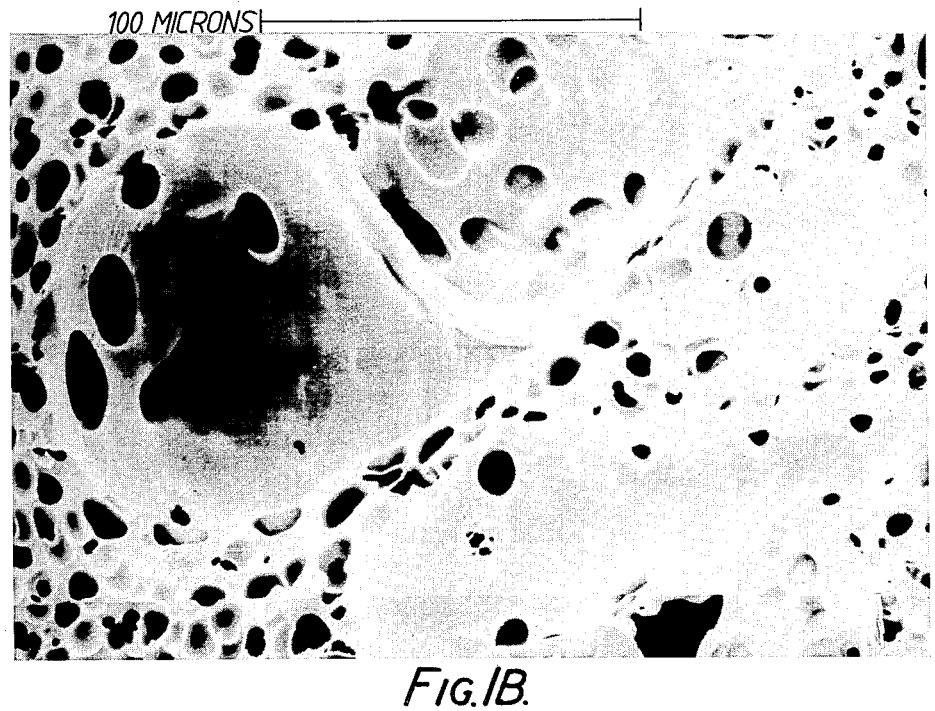
FIG. 1B is similar to FIG. 1A, but at increased magnification, namely 630-fold, and is of the region near the right hand side in FIG. 1A; 100 microns is represented by the scale at the top of the photomicrograph.

The photomicrographs were taken on a Cambridge Instruments Limited Stereoscan Model 100 electron microscope. The photomicrographs were prepared by cutting a smooth clean cross-section through the sheet samples. It will be appreciated that care must be taken to achieve an even smooth edge without jagged edges or pressure distortion or smearing of the structure. Thus, a new razor blade should be used for the preparation of each sample. The cut surface was then coated with a thin metallic, e.g. gold or palladium reflecting layer as is conventional in preparing samples for electron photomicrography. A stream of electrons was then directed onto the cut surface at 45°, and the electrons reflected from the surface at 45° were collected and used to produce an optical image which was photographed. It will be appreciated that the depth of focus of such photographs is very much greater than in optical photography and thus that in effect one is able to see into the voids and cavities.

All parts are by weight unless otherwise indicated.

EXAMPLE 1

The polyurethane polymer used was made in solution in dimethylformamide from a polyester by reaction with a diol and a diisocyanate under an inert atmosphere.

2300 parts of pure N,N-dimethylformamide (DMF) were placed in a 5000 parts reactor flushed with dry nitrogen. 0.048 parts of paratoluene sulphonic acid were dissolved in the DMF. 1219.2 parts of Desmophen (Trade Mark) 2001 polyester (a hydroxyl-terminated polyester of 2000 molecular weight, having an acid value of less than 1.0 and a hydroxyl number of about 55 mg KOH per g made from about 1 mol butane diol - 1,4, 1.12 mol ethylene glycol and 2 mols adipic acid) and 153.0 parts of butane diol - 1,4 were then added to the mixture and the temperature adjusted to 25° C.

632.8 parts of 4,4'- diphenylmethanediisocyanate were then added gradually, care being taken to keep the temperature from rising above 65° C. The reaction is maintained at this temperature and the iscyanate excess determined at intervals until a constant value is obtained (1½ to 2 hours). Sufficient butane diol (12 parts) was then added to react essentially stoichiometrically with the unreacted isocyanate. The mixture was then maintained at 65° C. with stirring and the viscosity measured periodically until it had risen to a value of 370 poise (Brookfield LVT using a No. 4 spindle at 12 rpm). 10 parts of ethylene glycol dissolved in 3.5 parts of DMF were then added as capping agent to terminate the reaction. The apparent viscosity at this stage of a sample was 2000 poise at 45% solids at 24° C. (Brookfield LVT No. 4 spindle 1.5 rpm), at 33% by weight solids the viscosity was 200 poise (Brookfield LVT, No. 4 spindle, 12 rpm, 24° C.). The intrinsic viscosity was 0.71 dl/g and the Huggins' slope constant k' of the viscosity number plot was 0.46. The nitrogen content was about 3.5% and the polyester content about 60%.

Non-porous but matt surfaced ceramic glove formers of conventional shape used for making conventional rubber gloves were sprayed with PTFE release agent then dipped into the above polyurethane solution diluted with DMF to 30% polymer solids (the solution had a viscosity 100 poise at 24° C. (Brookfield LVT No. 4 spindle at 12 rpm)). The formers were removed from the solution with a continuous coating of polymer adhering thereto, then allowed to drain for 1 minute, inverted (i.e. with fingers uppermost) and held for 30 seconds. They were then carefully submerged fingers first in a solution of 20% w/w DMF in water at 25° C. and held therein for 1 hour. The formers with the coatings thereon were now immersed in water at 60° C. for 12 hours in order to remove all the DMF and were subsequently dried in an air oven at 90° C. for 2 hours. It will be appreciated that coagulation of the polymer solution occurred only from the outer surface (21 in FIG. 1A) inwards.

The gloves were then stripped from the formers, the surface 20 in FIG. 1A being the surface which contacted the former.

It will be observed from FIG. 1A that the macropores 22 are located largely around the midplane of the thickness of the structure and substantially do not extend to either surface.

The properties of gloves made in this way as measured on the back of the hand of the glove are given in Table 1 below.

The elastomeric polyurethane, the production of which is described above in this Example is characterized by the following properties measured on a carefully cast void free film 0.15 to 0.2 mm thick made by evaporation of a degassed solution in dry air:

an adjusted initial modulus at 25% elongation (as herein defined) of 33.4 kg/cm$^2$ and at 100% elongation of 56.8, and adjusted tensile strength (as herein defined) of 435 kg/cm$^2$, an elongation at break of 658%, and an adjusted tear propagation (as herein defined) of 136.7 kg/cm, and a water vapor permeability (as herein defined) of 15.

EXAMPLE 2

Example 1 was repeated except that the polymer solution had a concentration of 22% by weight and this solution had a viscosity of 40 poise (Brookfield LVT No. 4 spindle, 12 rpm ,24° C.); at 33% by weight solids the viscosity was 600 poise (Brookfield LVT, No. 4 spindle, 6 rpm, 24° C.). The intrinsic velocity of the polymer was 0.70dl/g, the Huggins' slope constant k' of the viscosity number plot was 0.44. The nitrogen content was around 3.5 and the polyester content about 60%.

The properties of the resulting gloves are also given in Table 1 below.

The elastomeric polyurethane used in this Example was made in the same way as that described for Example 1 and is characterized by the following physical properties measured on a carefully cast film 0.15 to 0.2mm thick made by evaporation of a degassed solution in dry air:

an adjusted initial modulus at 25% elongation (as herein defined) of 37 kg/cm$^2$ and at 100% elongation 63.2, an adjusted tensile strength (as herein defined) of 458 kg/cm$^2$, an elongation at break of 670%, and an adjusted tear propagation (as herein defined) of 140.8 kg/cm, and a water vapor permeability (as herein defined) of 15.

Both the elastomeric polyurethanes described in Examples 1 and 2 (again, tested as a thin film made as described above) recover completely from a 5% elongation at room temperature (23° C.) but take on a permanent set (one measured for example as in an ASTM D412-66) after 100% elongation. Thus, they both show a tension set of some 10% immediately on release of the clamps after being held at the 100% elongation for 10 minutes and have a tension set of 6% measured 1 hour after the release of the clamps. (In the measurement a film specimen 1 cm wide with a gauge length of 5 cm is strained to the 100% elongation at a rate of 100 cm per minute.)

TABLE 1

| Example | 1 | 2 |
|---|---|---|
| Thickness (mm) (1) | 0.37 | 0.40 |
| Density (g/cm³) (2) | 0.43 | 0.34 |
| Measured Tensile strength (kg/cm width) (3) (8) | 1.52 | 1.56 |
| Measured initial modulus at 25% elongation (3) | 0.26 | 0.18 |
| Measured initial modulus at 100% elongation (3) | 0.53 | 0.40 |
| Elongation at break (%) (4) | 474 | 416 |
| Measured tear propagation (kg) (5) | 0.46 | 0.27 |
| WVP (6) | 120 | 155 |
| Hydrostatic head (cm H₂O) (7) | 600 | 450 |
| Adjusted tensile strength (kg/cm²) (9) | 41.0 | 39.0 |
| Adjusted initial modulus at 25% elongation (9) | 7.0 | 4.5 |
| Adjusted initial modulus at 100% elongation (9) | 14.3 | 9.9 |
| Adjusted tear propagation (kg/cm) (9) | 12.5 | 6.7 |
| Tensile tear factor (10) | 0.70 | 0.42 |

Notes on Table 1
(1) Thickness is measured using a dial micrometer gauge standing on a firm base. It is dead weight loaded and the load applied is 500 gf/cm². The presser foot is flat, circular and 10 mm in diameter. The anvil is also 10 mm in diameter and projects 3 mm above the surface of the platform of the instrument. The axes of the presser foot, anvil and platform are coincident. The readings of the gauge are accurate to 0.01 mm all along the scale. The load is applied gently to the sample and the reading taken 5 seconds after full load is reached. The values quoted are the average of five readings equidistantly spaced across the sample taken from the back of the hand of a glove.
(2) Density is determined by weighing the sample used to determine thickness and dividing its weight by the calculated volume.
(3), (4) Tensile strength, initial modulus at 25% and 100% elongation and elongation at break were measured on an Instron (RTM) tensile testing machine table model with hydraulic pneumatic jaws with steel jaw surfaces using the method of British Standard Specification No. 3144/1968 at 20° C., and 65% RH.
A sample cutter in accordance with BSS 3144/1968 is used to produce a dumb-bell shaped specimen (9 cm length overall × 1 cm width). Thickness is measured as above at five points along the 1 cm wide portion and the mean taken.
The sample is mounted in the jaws (steel jaws) with a jaw separation of 5 cms. The specimen is extended at 10 cm/min until 100% extension is reached with the load being continuously recorded. The rate of extension is then changed to 100 cm/min and the load applied and continuously recorded until the sample breaks.
(5) Tear propagation is measured in kg and the measurement is carried out on the Instron machine referred to above. The sample used is cut with a single stroke of a press with a knife-edged rectangular punch having parallel long sides 75 mm long and parallel short sides 45 mm long. A cut 20 mm long is made in the specimen with a sharp knife running from the middle of one short edge parallel to the long edges. The jaws of the tensile machine are set 20 mm apart and one edge 22.5 mm long is gripped in each jaw. The specimen is subjected to an increasing load by separating the jaws at 10 cm per minute until the specimen is torn along the cut. The average equilibrium value of load recorded is quoted as the tear propagation strength.
(6) WVP, water vapor permeability
Water permeability (WVP) is measured as follows:
A 30 mm high 70 mm diameter polythene sample holder with the top closed with a screw-cap having a 61.5 mm diameter hole in it occupied by a 67.5 mm diameter sample of the microporous material is used in an air-conditioned cabinet maintained at 37 ± 1° C. and at zero relative humidity by means of silica gel.
25 ml of distilled water are placed within the holder and the change in weight 'w' in a specified time 't' measured 3 hours after placing the jar in the cabinet and again at least 15 hours later is recorded.
The water vapor permeability $$\text{'wvp'} = \frac{336.6 \, w}{t}$$

grams per square meter per hour at 100% RH and 37° C.
(7) Hydrostatic head is measured by the method described in British Standard Specification No. 2823/1957, but the results are reported in cms head of water.
(8) Measured tensile strength is the measured tensile strength adjusted to 1 cm width.
(9) This adjusted value is the measured value adjusted to 1 cm in thickness.
(10) Tensile tear factor is the measured tensile strength multiplied by measured tear propagation.
(11) Since it is not possible to measure all the properties on a single glove, individual properties are measured on separate gloves from the same batch, but for each property the sample used to measure the property is first used to measure thickness and density.
Thus for WVP, the thickness and density are measured on the 67.5 mm diameter sample;
for hydrostatic head, thickness and density are measured on the 7 cm diameter sample;
for tensile strength, initial modulus and elongation at break, thickness and density are measured on the 9 cm long, 1 cm neck dumb-bell shaped sample; and
for tear propagation, thickness and density are measured on the 75 mm by 45 mm sample before the cut is made.

The elastomeric polyurethane may be used on its own or as blends with minor proportions say up to 49%, preferably less than 20% of polyvinyl chloride and other polymers and copolymers such as nitrile rubbers including solid copolymers of butadiene and acrylonitrile.

The preferred elastomeric polyurethanes are those having recovery properties intermediate between pure rubbers and pure thermoplastic materials at room temperature.

Polyurethanes may be based on a wide variety of precursors which may be reacted with a wide variety of polyols and polyamines and polyisocyanates. As is well known the particular properties of the resulting polyurethanes to a large extent can be tailored by suitable choice of the reactants, reaction sequence and reaction conditions.

The preferred polymers are elastomeric polyurethanes based on a linear, hydroxyl terminated polyester (although a polyether or a polyether/polyester blend may be used) and a diisocyanate, with a small addition of a difunctional low molecular weight reactant. The last mentioned component may be added either with the other reactants at the start of a one-step polymerization or at a later stage when it will act primarily as a chain extender or partly at the start and partly later.

Particularly preferred polyurethanes are those derived from polyesters by reaction with diols and diisocyanates. As is known from United States Patent Specification No. 2871218 many different polyesters, diols and diisocyanates can be used, but a particularly suitable polyurethane system is one in which a polyester made from ethylene glycol and adipic acid is reacted with 1,4-butylene glycol and with 4,4'- diphenylmethane diisocyanate.

In the system in accordance with the above specification the mole ratio of polyester and diol can vary between quite wide limits but the combined number of moles of polyester and diol is arranged to be essentially equivalent to the number of moles of diisocyanate so that the resultant polymer is essentially free of unreacted hydroxyl or isocyanate groups.

The preferred polyurethane polymers are essentially linear polyurethanes produced from a diisocyanate, a monomeric diol and a polyester or a polyether of molecular weight 1,000 to 3,000, the polyurethane having an intrinsic viscosity in dimethyl formamide of at least 0.5 dl/g.

Especially preferred polyurethanes may have a nitrogen content of about 3.0 to 4.0%, e.g. around 3.5%. Such material can be made by increasing the ratio of polyester to glycol resulting in a lower requirement of diisocyanate as compared to polyurethanes having a higher nitrogen content, such as 4.5% or more.

The polymers may be produced by a bulk polymerization process and subsequently dissolved in suitable solvents or may be prepared directly in solution by a solution polymerization process.

The polymer can include conventional stabilizers, fillers, processing aids, pigments, dyes, and additives such as surface active agents or proofing agents, and when the polymer content is quoted in the claims this includes any such additives which may replace up to 10% w/w of the polymer.

A further polyurethane system which has been found suitable uses polyesters derived from caprolactones. Such polyurethanes are described in British Patent Specification No. 859640.

A particularly preferred type of polyurethane is that made by the novel solution polymerization process disclosed in U.S. Patent Specification Ser. No.3709864 and Belgian Patent No. 742471. Such polyurethanes for use in the present invention are desirably characterized by having intrinsic viscosities in the range 0.5 to 0.85 dl/g.

The intrinsic viscosity is determined in highly dilute solution in analytical grade DMF which has been thoroughly dried by storage under a nitrogen atmosphere over a molecular sieve (Linde 5A). Four measurements at 25° C. corresponding to four, approximately equally spaced, concentrations are made and intrinsic viscosity 3 and polymer solvent interaction parameter are determined by the Huggins equation:

$$\frac{\eta sp}{C} = [\eta] + K' [\eta]^2 C$$

when $\eta sp$ is the specific viscosity and C is concentration expressed in g/100 ml, and $[\eta]$ is the intrinsic viscosity, and k' is the Huggins slope constant.

The use of solvents has been mentioned.

Many polar organic solvents could be used but DMF is preferred.

The particular solvent which is used can vary depending on the particular polymer composition and nonsolvent which are being used. The solvent should not react with the other components of the system although it can form complexes with the nonsolvent e.g. hydrates when the nonsolvent is water as is believed to be the case with DMF. Also, the solvent must be miscible with the nonsolvent, preferably completely so, and must be able to be extracted from the coagulated polymer.

Solvents which could be used instead of DMF include amides, esters, ketones, sulphones, and phenols, however preferred alternative solvents to DMF are dimethyl sulphoxide, N - methyl pyrrolidone, and dimethyl acetamide and blends thereof with cheaper solvents such as toluene and xylene which although not solvents for the polyurethane on their own do not act as nonsolvents when mixed with dimethylformamide.

The nonsolvent to be used will also vary depending on the particular polymer composition and solvent which are being used. Again, the nonsolvent should be chemically inert to the polymer though it may form complexes with the solvent. The nonsolvent should be miscible with the solvent and should be a nonsolvent for the polymer i.e. when added in excess to a solution of the polymer it should coagulate the polymer.

Suitable inert nonsolvent liquids include methanol, ethanol, water, hydrocarbons such as benzene, toluene, chlorinated hydrocarbons, such as tetrachloroethylene and chloroform, polyols such as ethylene glycol, glycerol, and glycol ethers such as ethylene glycol monoethylether and mixtures thereof which are miscible with the solvent. However, the preferred nonsolvent is water since it presents no recovery problems and is far cheaper than any of the alternatives.

We claim:

1. Flexible, form-fitting, seamless gloves which are permeable to water vapor but impervious to liquid water which are constituted by a continuous water-vapor-permeable layer of elastomeric polyurethane material, the gloves having a selected permeability to water vapor and affording an outer surface having a selected resistance to liquid water penetration under a pressure differential between the faces of the material, whereby said outer surface is hydrophobic; the gloves being of a continuous water-vapor-permeable layer and being free of fiber reinforcement; the gloves having the following properties as measured on samples cut from the back of the hand of the glove:
   (a) a thickness of 0.10 to 0.45 mm,
   (b) the selected permeability to water vapor being a water vapor permeability (as defined herein) in the range of 75 to 200 grams/m$^2$/hr,
   (c) the selected resistance to liquid water penetration resulting in the outer surface being hydrophobic being a hydrostatic head (as defined herein) in the range of 300 to 700 cm of water,
   (d) a tensile tear factor (as herein defined) of 0.20 to 1.20,
   (e) an initial modulus at 25% elongation not in excess of 0.35 kg/cm, and
   (f) an elongation at break (as herein defined) of at least 200%.

2. Gloves as claimed in claim 1 which have a density of 0.25 to 0.60 g/cm$^3$.

3. Gloves as claimed in claim 2 in which the polyurethane is an aliphatic polyester polyurethane having an intrinsic viscosity in the range 0.5 to 0.85 dl/g.

4. Gloves as claimed in claim 1, in which the polyurethane from which the gloves are made is characterized by the following properties measured on an evaporated, cast, void-free film 0.15 to 0.2 mm thick:

(a) an adjusted initial modulus at 25% elongation (as herein defined) of less than 50 kg/cm$^2$,
(b) an adjusted tensile strength (as herein defined) of at least 200 kg/cm$^2$,
(c) an elongation at break of at least 300%,
(d) an adjusted tear propagation (as herein defined) of at least 50 kg/cm, and
(e) a water vapor permeability (as herein defined) of no more than 20 grams/m$^2$/hr.

5. Gloves as claimed in claim 4 in which the polyurethane is an aliphatic polyester polyurethane having an intrinsic viscosity in the range 0.5 to 0.85 dl/g.

6. Gloves as claimed in claim 4 in which the polyurethane is an aliphatic polyester polyurethane having an intrinsic viscosity in the range of 0.5 to 0.85 dl/g.

7. A method of making flexible, form-fitting, seamless gloves each being constituted by a continuous water-vapor-permeable layer which method comprises forming a solution of an elastomeric thermoplastic polyurethane, having an intrinsic viscosity in the range of 0.5 to 0.85 dl/g, in a solvent at a concentration of at least 15% by weight, the solution having a viscosity not in excess of 150 poise at 24° C. as measured on a Brookfield LVT viscometer using a No. 4 spindle at 12 rpm; forming a continuous layer of the solution on a nonporous former of the desired glove form; solidifying the layer on the former to form-fitting, seamless shape by exposing the said layer to a nonsolvent for the polyurethane whereby the polyurethane is coagulated from the outer surface inward; which seamless glove, after leaching to remove the solvent and drying, has a WVP of at least 75 grams/m$^2$/hr and a hydrostatic head of at least 300 cm of water; and then stripping the seamless gloves from the former.

8. A method as claimed in claim 7, in which the polyurethane is characterized by the following properties measured on an evaporated, cast, void-free film 0.15 to 0.2 mm thick:
(a) an adjusted initial modulus at 25% elongation (as herein defined) of less than 50 kg/cm$^2$,
(b) an adjusted tensile strength (as herein defined) of at least 200 kg/cm$^2$,
(c) an elongation at break of at least 300%,
(d) an adjusted tear propagation (as herein defined) of at least 50 kg/cm, and
(e) a water vapor permeability (as herein defined) of no more than 20 grams/m$^2$/hr.

9. Gloves whenever made by a method as claimed in claim 8.

10. Gloves whenever made by a method as claimed in claim 7.

11. Flexible, form-fitting, seamless gloves which are permeable to water vapor but impervious to liquid water, the gloves being constituted by a continuous water-vapor-permeable layer of elastomeric polymeric material, the gloves having a selected permeability to water vapor and affording an outer surface having a selected resistance to liquid water penetration under a pressure differential between the faces of the material whereby the said outer surface is hydrophobic, the gloves being of a continuous water-vapor permeable layer and being free of fiber reinforcement, the gloves having the following properties as measured on samples cut from the back of the hand of the gloves:
(a) a thickness in the range of 0.10 to 0.45 mm,
(b) the selected permeability to water vapor being a water vapor permeability (as herein defined) of at least 75 grams/m$^2$/hr, and
(c) the selected resistance to liquid water penetration being a hydrostatic head (as herein defined) of at least 300 cms of liquid water.

12. Gloves as claimed in claim 11 being constituted by an elastomeric polyurethane material.

13. Gloves as claimed in claim 11, in which said gloves have the following properties as measured on samples cut from the back of the hand of the glove:
(a) a tensile tear factor (as herein defined) of 0.20 to 1.20;
(b) an initial modulus at 25% elongation not in excess of 0.35 kg/cm; and
(c) an elongation at break of at least 200%.

14. Gloves as claimed in claim 11, which have a density of 0.25 to 0.60 g/cm$^3$.

15. Gloves as claimed in claim 11 in which the polyurethane is an aliphatic polyester polyurethane having an intrinsic viscosity in the range of 0.5 to 0.85 dl/g.

16. Gloves as claimed in claim 11, in which the polyurethane from which the gloves are made is characterized by the following properties measured on an evaporated, cast, void-free film 0.15 to 0.2 mm thick:
(a) an adjusted initial modulus at 25% elongation (as herein defined) of less than 50 kg/cm$^2$,
(b) an adjusted tensile strength (as herein defined) of at least 200 kg/cm$^2$,
(c) an elongation at break of at least 300%,
(d) an adjusted tear propagation (as herein defined) of at least 50 kg/cm, and
(e) a water vapor permeability (as herein defined) of no more than 20 gram/m$^2$/hr.

* * * * *